US006575480B2

(12) United States Patent
McKelvey

(10) Patent No.: US 6,575,480 B2
(45) Date of Patent: Jun. 10, 2003

(54) ADD-ON SECTION FOR ATTACHMENT TO A CART WITH A CONVERTIBLE SEAT

(75) Inventor: Richard L. McKelvey, Rogers, AR (US)

(73) Assignee: Assembled Products Corporation, Rogers, AR (US)

( * ) Notice: Subject to any disclaimer, the term of this patent is extended or adjusted under 35 U.S.C. 154(b) by 0 days.

(21) Appl. No.: 09/761,230

(22) Filed: Jan. 16, 2001

(65) Prior Publication Data

US 2002/0093179 A1 Jul. 18, 2002

(51) Int. Cl.[7] ................................................. B62B 3/02
(52) U.S. Cl. .............. 280/33.993; 280/650; 297/256.17
(58) Field of Search ....................... 280/33.992, 33.993, 280/642, 643, 650, 651; 297/256.17, 256.16, 378.1, 378.14

(56) References Cited

U.S. PATENT DOCUMENTS

| 3,044,801 A | * | 7/1962 | Vicany ................... 280/33.992 |
| 4,204,695 A | | 5/1980 | Salzman |
| 4,216,951 A | | 8/1980 | Griffin |
| 4,685,688 A | * | 8/1987 | Edwards .................... 280/643 |
| 4,729,600 A | * | 3/1988 | Single, II et al. ....... 297/256.16 |
| 4,763,907 A | | 8/1988 | Raymond |
| 4,971,343 A | | 11/1990 | Wood |
| 5,081,724 A | | 1/1992 | Takahashi et al. |
| 5,098,153 A | | 3/1992 | Antoine |
| 5,211,410 A | | 5/1993 | Trubiano |
| 5,312,122 A | * | 5/1994 | Doty .................... 280/33.992 |
| 5,356,161 A | | 10/1994 | Pokhis |
| 5,429,414 A | | 7/1995 | Olsson et al. |
| 5,460,426 A | * | 10/1995 | Tribelsky et al. ........ 297/378.1 |
| 5,524,959 A | | 6/1996 | Scott |
| 5,547,205 A | | 8/1996 | do Rosario Sousa de Cabedo |
| 5,823,548 A | * | 10/1998 | Reiland et al. ........ 280/33.993 |
| 5,848,797 A | * | 12/1998 | Paez .................... 280/33.993 |
| 5,918,891 A | * | 7/1999 | Russell ................. 280/33.992 |
| 6,102,479 A | * | 8/2000 | Wallace .................... 297/16.1 |

FOREIGN PATENT DOCUMENTS

| GB | 2 225 557 A | * | 6/1990 | ................. 280/643 |
| WO | 84/01335 | * | 4/1984 | ............ 280/33.992 |

* cited by examiner

Primary Examiner—Frank Vanaman
(74) Attorney, Agent, or Firm—Boyd D. Cox

(57) ABSTRACT

An add-on section for use with a shopping cart has a convertible seat which provides seating for passengers, or alternately provides a support surface for holding an infant carrier. The convertible seat includes a pivoting panel that can be pivoted between a raised position in which the panel functions as the seat's back rest and a lowered position in which the panel serves as a holder for an infant carrier.

29 Claims, 7 Drawing Sheets

ADD-ON SECTION FOR ATTACHMENT TO A CART WITH A CONVERTIBLE SEAT

BACKGROUND

The present invention is directed to a convertible seat on an add-on section for use with a shopping cart. The convertible seat has a pivoting panel which can be alternated from an upright position to a lowered position. In the upright position, the panel functions as a back rest for passengers seated in the add-on section. Alternately, in the lowered position, the panel functions as a support surface for holding an infant carrier.

Infant carriers are commonly used by caretakers for holding infants. An infant carrier can serve as bed, seat, playpen, feeding chair and even car seat for a small child. Consequently, these infant carriers are versatile enough to enable the child to remain in the carrier while engaged in varying activities. Since these carriers are also portable, a caretaker can transport the baby in his or her infant carrier as the caretaker moves from one location to another.

On a shopping trip, an infant carrier enables the caretaker to more easily transport an infant therealong. Some stores even provide in-house infant carriers attached to their shopping carts in which shoppers can place their infants as they shop. While this may be a convenience to some shoppers, there are several drawbacks to having an in-house infant carrier attached to the shopping cart.

After each use, a shopping cart is generally returned to the store to be used by another shopper. Consequently, an infant carrier provided by the store on a shopping cart can be used repeatedly by different shoppers in a short period of time. Typically, neither the cart nor the attached infant carrier are cleaned by store personnel in between each use. As a result, the infant carrier can become dirty, sticky and/or unsanitary. Additionally, there is a risk of contagions being left on the carrier by previous users. By using an in-house infant carrier, the caretaker may risk exposing the child to unclean and unsafe conditions.

To reduce doubts about the cleanliness of the in-house infant carrier, a user can clean the carrier prior to placing the child in it. However, cleaning the infant carrier prior to every use can be inconvenient for a shopper since it requires the shopper's time and the necessary cleaning supplies. There is the added inconvenience for the shopper to have to clean the carrier while he or she also supervises the attendant child who is to be placed in the carrier.

An in-house infant carrier is typically positioned directly over the cart's child seat and is bolted to the cart. Therefore, the infant carrier is not readily removable. With the infant carrier so positioned, the cart's child seat is inaccessible. A shopper needing to use the cart's child seat instead of the infant carrier or in addition to the infant carrier is unable to use the shopping cart effectively.

Furthermore, if the child is already in an infant carrier when the shopper arrives at the store, the infant must be transferred from his infant carrier to the one attached to the shopping cart. Not only can this transfer process be inconvenient for the shopper, but it is also disruptive for the child, especially if the child is asleep.

Often to avoid moving an infant from his infant carrier to one provided on the shopping cart, a shopper will leave the baby in his carrier and simply place the carrier in the basket of the shopping cart. While this may be a more desirable alternative than moving the baby from his carrier to another, it is not always the most advantageous. With the infant and carrier in the basket, the amount of space in the shopping cart for storing items is decreased considerably. Some shoppers simply use two carts when shopping with an infant, one cart for holding the infant carrier, and the other cart for storing shopping items. However, it is difficult for one person to simultaneously maneuver two shopping carts.

Add-on sections that attach to shopping carts and provide additional seating for shopping carts are known in the art. While these add-on sections have passenger seating areas, they generally lack any special accommodation for holding an infant in his or her infant carrier. While the infant carrier may be perched on the seats of such add-on sections as the shopper completes his task, there exists a danger of the infant carrier sliding off the seat and injuring the infant.

For the foregoing reasons, there is a need for a device that can be converted from a passenger seat to a holder for securely retaining an infant carrier along with an infant. Particularly, there is a need for a shopping cart add-on section that provides seating for passengers and alternately provides a secure support area for releasably holding an infant carrier.

SUMMARY

The present invention is directed to a convertible seat for accommodating passengers on an add-on section used with a shopping cart that satisfies the need for a passenger area that can alternate between a configuration for holding seated passengers ranging in age from child to adult and a configuration for releasably holding an infant and an infant carrier.

The convertible seat of the add-on section comprises a pivoting panel that can be moved between an upright position in which a first surface of the panel provides a back rest for seated passengers and a lowered position in which a second surface of the panel provides a generally horizontal support surface for holding an infant and infant carrier thereon. A lip extending outwardly from the second surface of the panel and a holddown strap inhibit unwanted movement of the infant and carrier on the panel's surface in the lowered positions thereby protecting the carrier from sliding off the panel's surface.

It is an object of the present invention to provide a passenger add-on section for a shopping cart that can hold seated passengers and alternately hold an infant and infant carrier.

It is a further object of the present invention to provide an add-on section for a shopping cart that can hold an infant carrier.

It is a further object of the present invention to provide an add-on section for a shopping cart that can convert from a seat's back rest to a support surface for holding an infant carrier.

It is a further object of the present invention to provide a convertible seat having a back rest that converts to a generally horizontal support surface for supporting an infant carrier.

It is a further object of the present invention to provide an add-on section for a shopping cart having a support area for releasably holding an infant carrier.

It is a further object of the present invention to provide a seat having a back rest that folds from an upright position to a lowered position to function as a generally horizontally support surface.

It is a further object of the present invention to provide a passenger add-on section for a shopping cart with an infant carrier support that inhibits unwanted movement of the infant carrier held thereon.

BRIEF DESCRIPTION OF DRAWINGS

Reference is made to the accompanying drawings in which are shown illustrative embodiments of the invention and from which novel features and advantages will be apparent.

DETAILED DESCRIPTION

Figure 1:
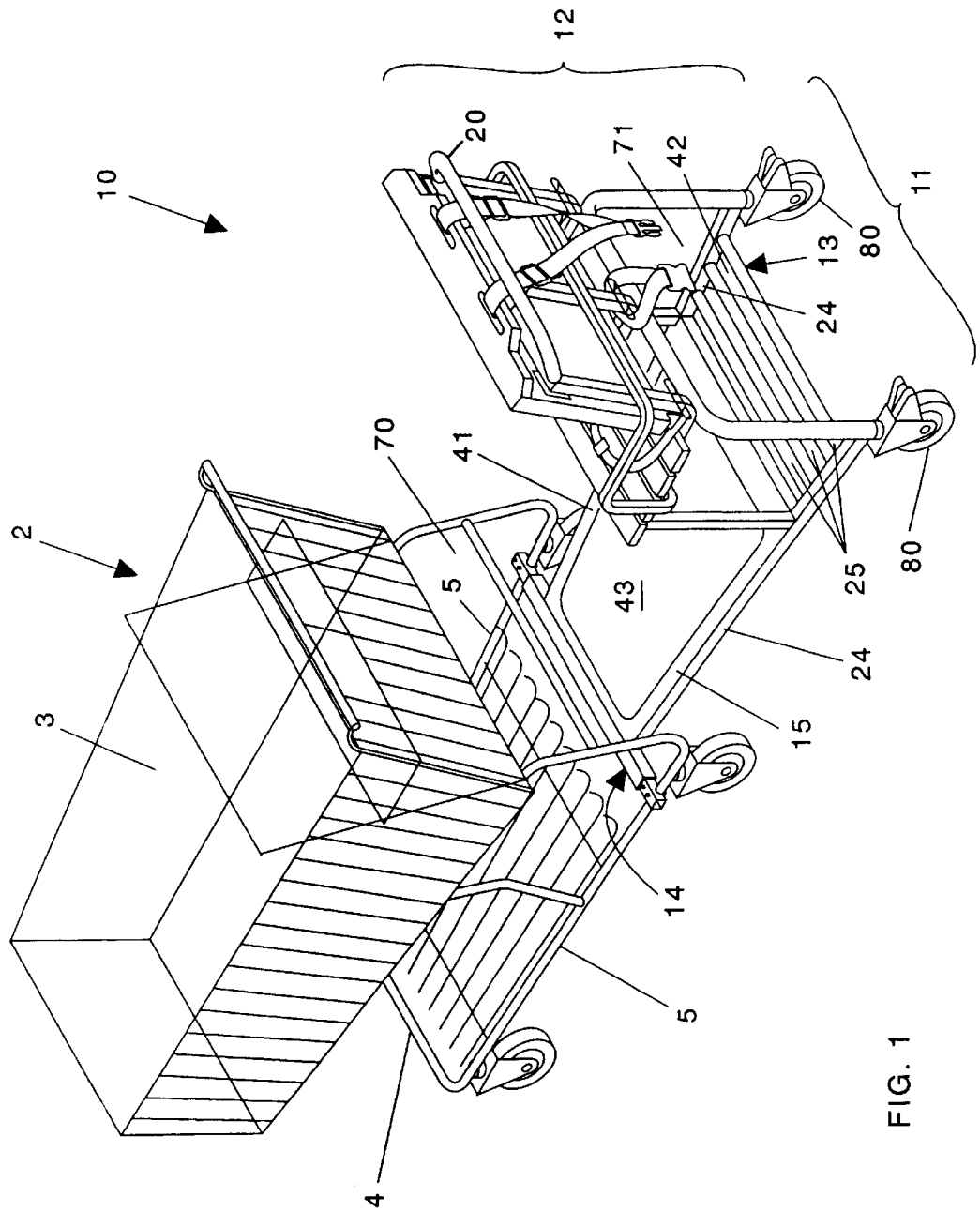
FIG. 1 is a rear perspective view of a preferred embodiment of the add-on section of the present invention attached to a conventional shopping cart.

A preferred embodiment of the present invention is for use with a conventional push shopping cart (2), as shown in FIG. 1, commonly used in stores by shoppers to hold selected items for purchase. These shopping carts (2) generally include a receptacle, such as a basket (3) supported on a wheeled base frame (4). The base frames (4) on such shopping carts (2) typically include at least a pair of lower tubular members (5). In a preferred use, the add-on section (10) of the present invention attaches to the lower tubular members (5) of the cart's base frame (4).

Referring to the drawings wherein like characters designate corresponding parts throughout the views and referring particularly to FIG. 1, there is shown a combined unit comprising the add-on section (10) of a preferred embodiment of the present invention attached to a shopping cart (2).

Figure 3:
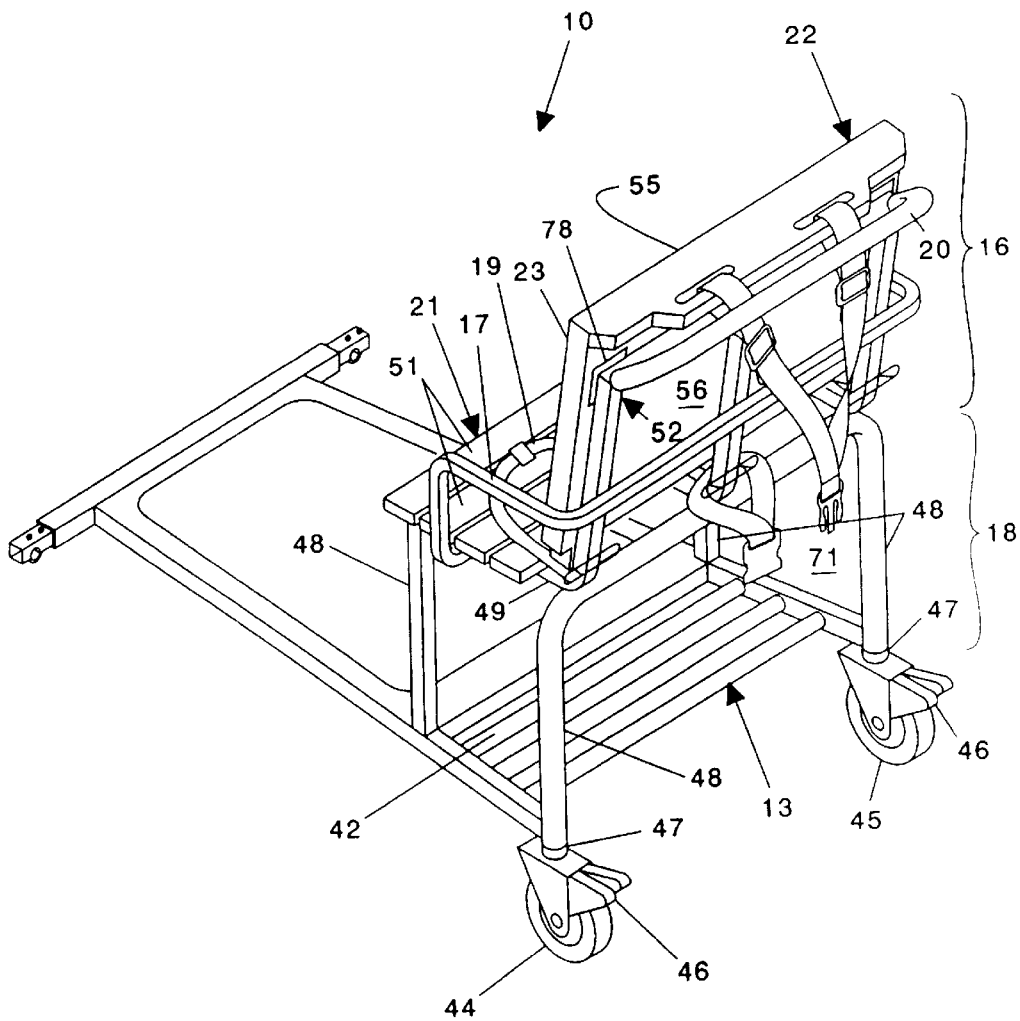
FIG. 3 is a rear perspective view of the add-on section in FIG. 1 with the pivoting panel in the raised position.

In a preferred embodiment, the add-on section (10) is a shopping aid which comprises a base (11) and a convertible seat (12). The base (11) includes a lower support frame (13), an adjustable cart mounting system (14), and a platform (15) which are supported by a pair of wheel assemblies (80). Referring to FIG. 3, the convertible seat (12) comprises a seating portion (16) flanked by arm rests (17) and a seat portion support (18). The seating portion (16) includes a seat bottom (21) and a convertible member (22). The convertible member (22) includes a pivoting panel (23) that serves as both a seat back rest and an infant carrier support.

In FIG. 1, the lower support frame (13) of the base (11) is shown to comprise side members (24) intersected by a plurality of cross members (25). The lower support frame (13) further includes a front section (41) and a rear section (42).

The cart mounting system (14) is an adjustable mounting means for attaching the add-on section (10) to the shopping cart (2). The mounting system (14) in FIGS. 4 and 5 comprises a support arm (26) having a first end (27) and a second end (28). A first extensible arm (29) is telescopically mounted in the first end (27) of the support arm (26) and a second extensible arm (30) is telescopically mounted in the second end (28) of the support arm (26).

A locking means is positioned on the first (27) and second (28) ends to lock the respective first (29) and second (30) extensible arms at selected positions within the support arm (26). The locking means comprises first (31) and second (32) lock elements. Each of said first (31) and second (32) lock elements includes a set screw (33) engaged in a threaded aperture (34) disposed on each respective first (27) and second (28) end of the support arm (26). It should be appreciated that other types of lock elements could be used in lieu of the set screw disclosed herein.

The first extensible arm (29) includes a free end having a first clamp (35), while the second extensible arm (30) also has a free end with a second clamp (36) thereon. Each of the first (35) and second (36) clamps is formed by a notch (37) and a pair of apertures (38) in the respective first (29) and second (30) extensible arms. Each of the first (35) and second (36) clamps further comprises a U-bolt (39) received in the respective pair of apertures (38) on the extensible arm (29, 30) and secured thereto with cooperating nuts (40).

The lower support frame (13) includes a front section (41) which provides an area for passenger leg room and a rear section (42) which provides an area for storage. The platform (15) is a planar member disposed on the front section (41) of the lower support frame (13). A gripping surface (43) is disposed on a top surface of the platform (15). Preferably, the gripping surface (43) is a rubber mat, but could comprise any type of roughened surface having non-slip characteristics, such as granule or sand-roughened surfaces, molded surface textures, or etched surface textures.

In FIG. 3, the wheel assemblies (80) are shown to comprise first (44) and second (45) wheels and are attached to a rear portion of the lower support frame (13). Both the first (44) and second (45) wheels include a wheel brake (46) and a pivot bearing (47).

Figure 2:
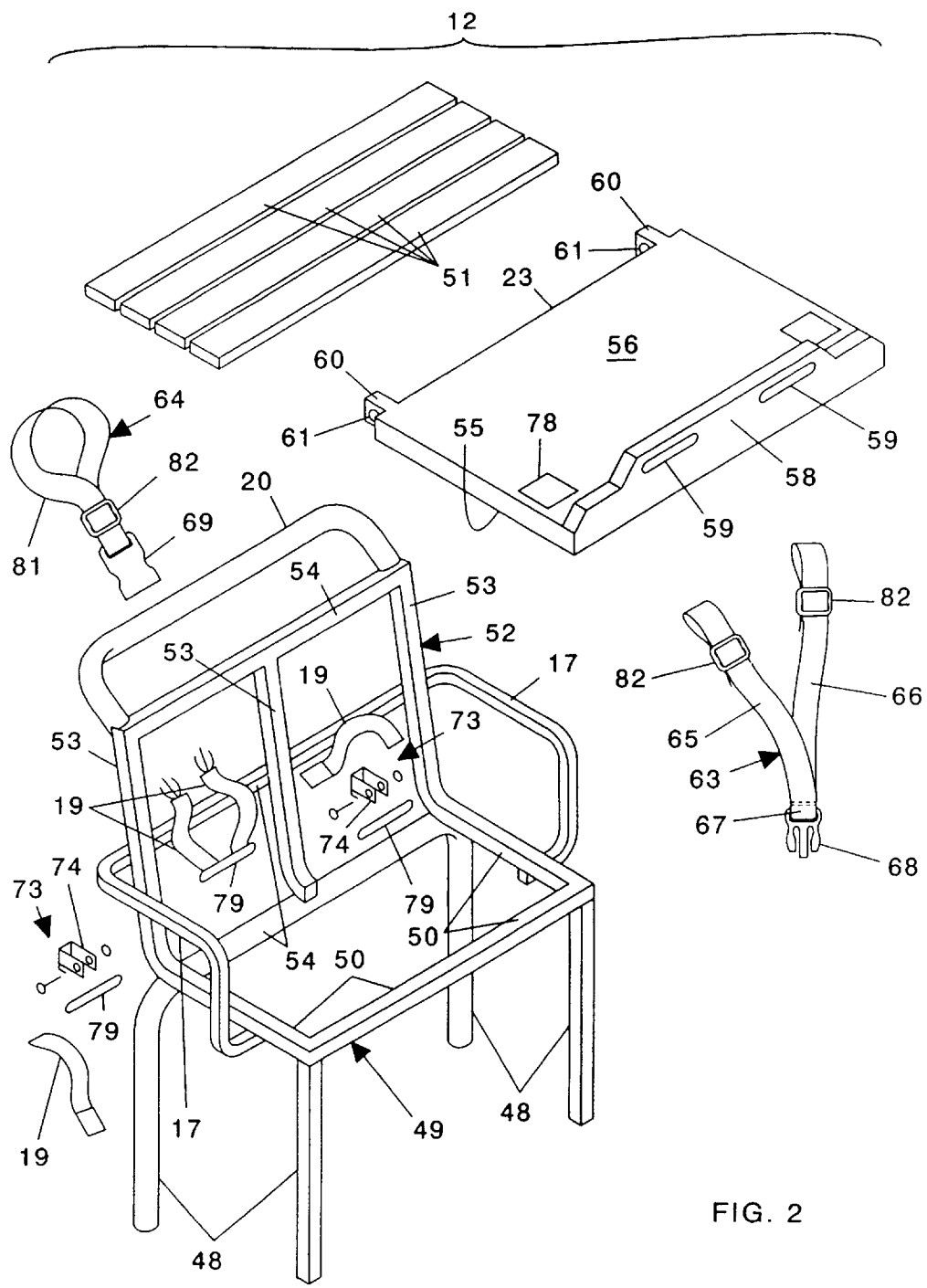
FIG. 2 is an exploded view of the convertible seat of the add-on section in FIG. 1.

Referring to the convertible seat (12) shown in a preferred embodiment of FIGS. 2 and 3, the seat portion support (18) comprises a plurality of legs (48) formed of tubular members extending upwardly from the rear section (42) of the lower support frame (13).

The seat bottom (21) of the seating portion (16) is partially formed by a bottom frame (49) comprised by a plurality of tubular frame members (50) and slats (51) mounted atop the tubular frame members (50).

The seating portion (16) also includes a seat frame (52). A plurality of vertical struts (53) intersected by horizontal members (54) form the seat frame (52) of the seating portion (16).

Figure 4:
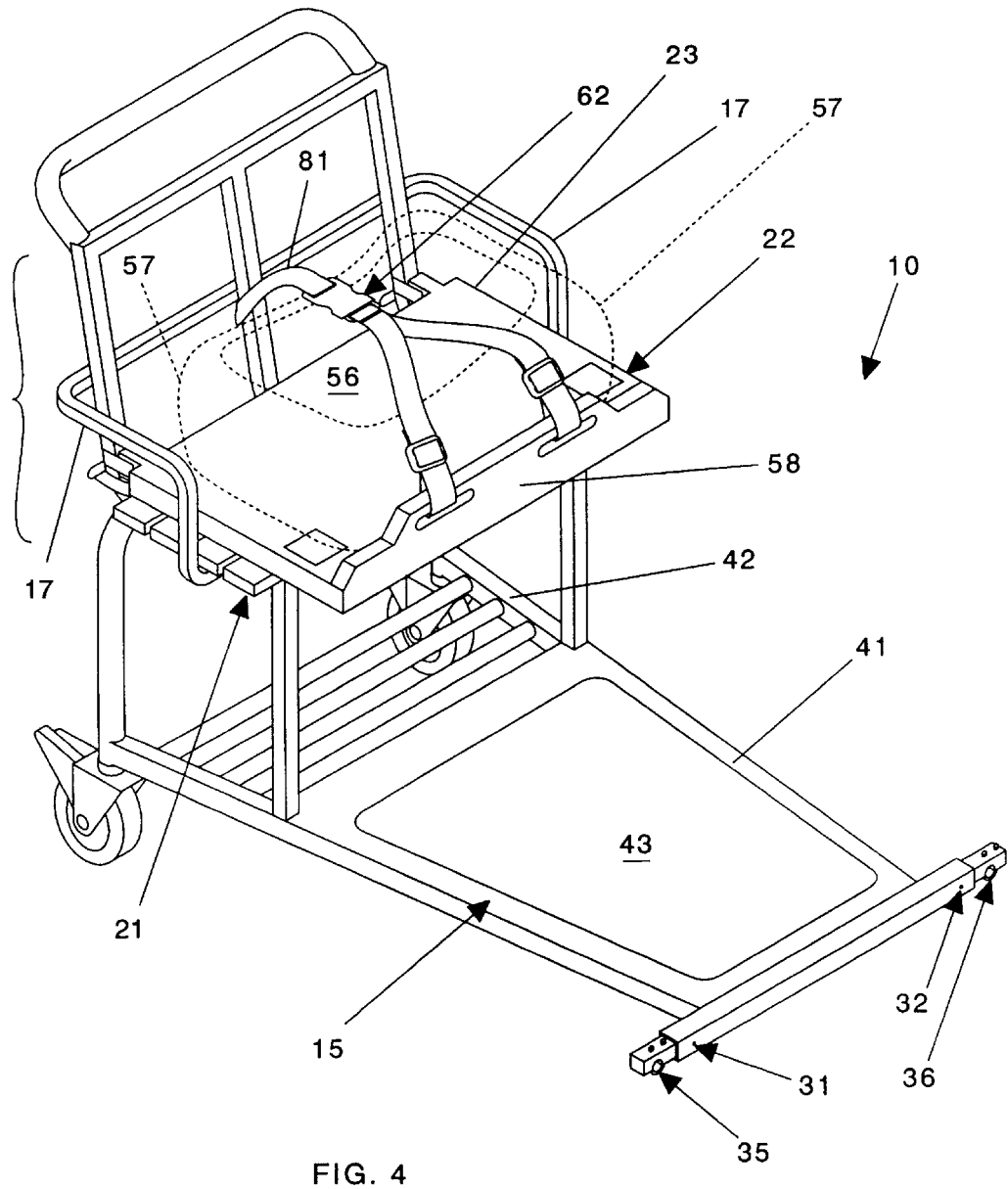
FIG. 4 is a front perspective view of the add-on section of FIG. 1 with the pivoting panel in the lowered position with an infant carrier supported thereon.

The pivoting panel (23) of the convertible member (22) has a first surface (55) which can be used as a back rest and a second surface (56) which can be used as a support area for an infant carrier (57) as shown in FIGS. 2 and 4. A lip (58) extends outwardly from one edge of the panel's second surface (56). The lip (58) has a pair elongated openings (59) therethrough. Disposed on an opposite edge of the pivoting panel (23) from the lip (58) are a pair of ears (60). A hole (61) extends through each of the ears (60).

Attached to the pivoting panel (23) of the passenger area (12) is a holddown strap (62) as shown in FIG. 4. As shown in FIG. 2, the holddown strap (62) is adjustable and comprised of first (63) and second (64) sections that can be joined to each other by a releasable fastener. The first section (63) is V-shaped and includes first (65) and second (66) adjustable legs which adjoin at an apex (67). Each of the first (65) and second (66) legs has an adjusting element (82). The second section (64) is an adjustable strap (81) that forms a loop and has an adjusting element (82) thereon. In a preferred embodiment, the releasable fastener is a buckle with first (68) and second (69) interlocking parts. The first interlocking part (68) is attached to the apex (67) of the strap's first section (63) and the second interlocking part (69) is attached to the adjustable strap (81) of the second section (64). Although a buckle is disclosed herein, other types of suitable releasable fasteners, including snaps, clips or hook and loop fasteners, could be used instead.

In addition, the convertible seat (12) includes a plurality of seat belts (19). The seat belts (19) are secured to the seat frame (52) by attaching clips (79). During use the seat belts (19) extend between the pivoting panel (23) and the seat bottom (21) towards the front of the add-on section (10).

A handle (20) is positioned on a rear side of the convertible seat (12) and attached to the seat frame (52).

The pivoting panel (23) is shown to be planar with a generally rectangular shape. The lip (58) is elongated and extends along a free outer edge of the pivoting panel (23).

In a preferred embodiment of FIG. 1, the lower support frame (13) and the attached platform (15) of the base (11) are trapezoidally shaped. A shorter edge of the lower support frame (13) defines a front end of the add-on section (10) and the opposing longer edge defines a rear end of the add-on section (10). Although the lower support frame (13) and platform (15) are trapezoidally shaped, they are not so limited and both could be formed in variety of suitable shapes including geometrical and non-geometrical shapes.

Preferably, the first (63) and second (64) sections of the holddown strap (62) are made from nylon webbing. However, the sections (63, 64) could comprise other suitable materials. For example, the sections (63, 64) could comprise elastic material.

The lower support frame (13) of the base (11), the support arm (26) and extensible arms (29, 30) of the adjustable cart mounting system (14), the bottom frame (49), the seat frame (52) and the legs (48) of the seat portion support (18) are all made of tubular steel, as are the armrests (17) and the handle (20). The platform (15) on the lower support frame (13) is preferably plastic sheet material.

On the convertible seat (12), the slats (51) and the pivoting panel (23) are preferably formed of durable plastic.

The elements comprising the present invention are not limited in manufacture to the materials disclosed herein, but could be made from other materials, selected by one skilled in the art. Such materials could include, but are not limited to woods, plastics, and/or metals, having the requisite durability and strength to withstand use.

The platform (15) on the front section (41) of the lower support frame (13) is used as a step for passengers entering and exiting the add-on section (10) and also serves as a foot rest for passengers when seated in the add-on section (10). The gripping surface (43) on the platform (15) is a safety device to deter passengers from slipping as they are stepping on or stepping off of the add-on section (10). The front section (41) further defines a leg room area (70) for those passengers seated in the add-on section (10). The rear section (42) provides an additional storage area (71) on the add-on section (10).

Figure 5:
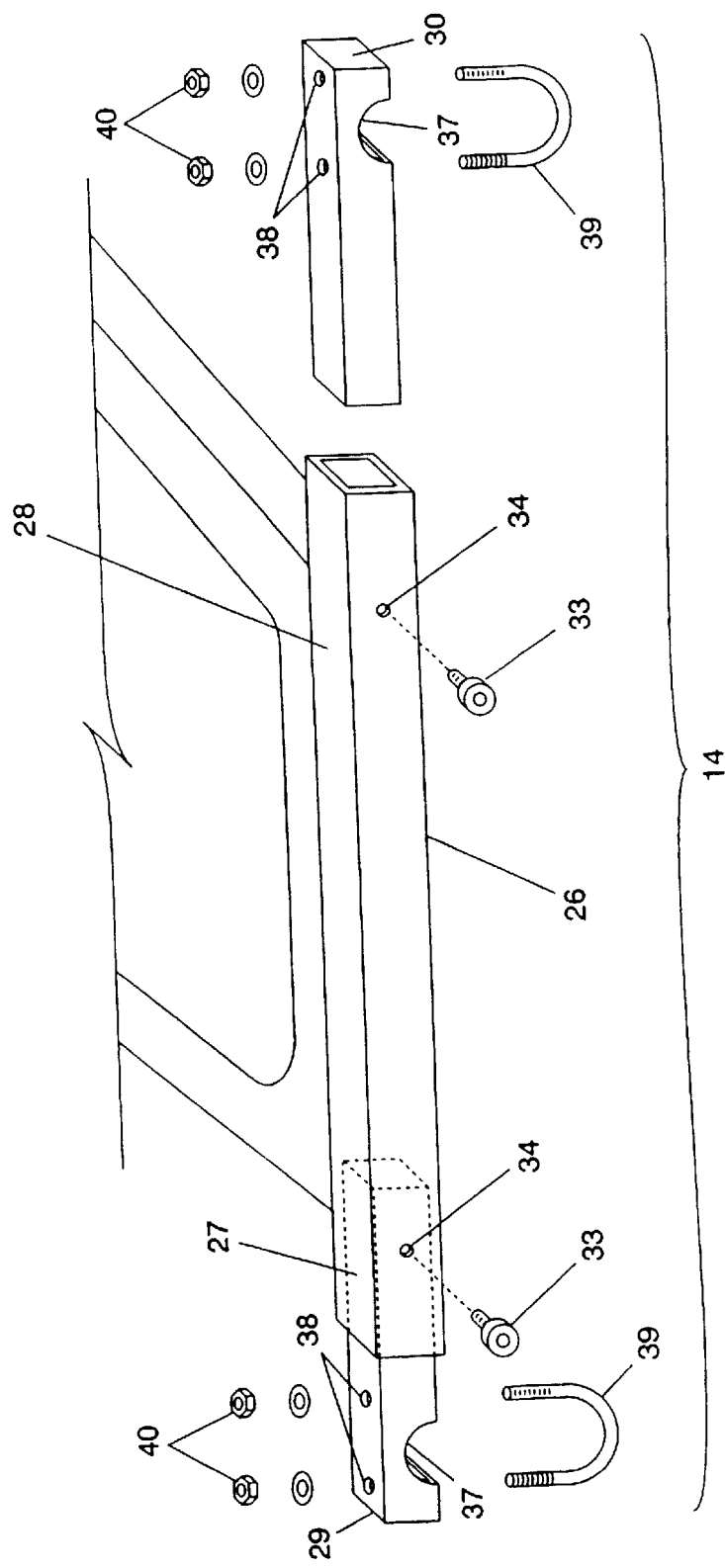
FIG. 5 is a partial exploded view of the adjustable cart mounting system and a lock element of the add-on section in FIG. 1.

The adjustable cart mounting system (14) enables the add-on section (10) to be attached to different sizes of shopping carts, and also enables the add-on section (10) to be secured at various selective positions along the base frame (4) of the shopping cart (2). The first (29) and second (30) extensible arms are adjustably disposed within and supported by the respective first (27) and second (28) ends of the support arm (26), as shown in FIG. 5. By adjusting the effective length of the extensible arms (29, 30), the effective width of the cart mounting system (14) can be adjusted to fit different sized carts and to fit various selective positions along the cart's base frame (4).

The locking means secures the respective first (29) and second (30) extensible arms on the support arm (26) against sliding movement. Each set screw (33) is threadedly engaged within a respective threaded aperture (34). A threaded aperture (34) is located on each respective first (27) and second (28) end of the support arm (26). In order to lock a particular extensible arm to inhibit its movement within the support arm (26) the associated set screw (33) is tightened against the respective first (29) or second (30) extensible arm. Conversely, when the set screw (33) is loosened from a respective extensible arm, the extensible arm (29, 30) is allowed to slide within the support arm (26). That extensible arm (29, 30) can then be moved to a selected position and locked in place by tightening the respective set screw (33).

The wheel assemblies (80) movably support the rear end of the base (11). When the add-on section (10) is attached to a shopping cart the wheel assemblies (80) allow the add-on section (10) to move easily with the shopping cart (2). On each of the wheel assemblies (80), the brake (46) shown in FIG. 3, can be engaged to lock the respective first (44) and second (45) wheels against rolling movement. By locking at least one and preferably both wheels (44, 45), the combined unit is steadied for passengers entering or exiting the add-on section (10).

The pivot bearings (47) on each of the wheels (44, 45) allow the respective wheel assembly (80) to swivel freely about an axis extending generally perpendicular to the platform surface. This swiveling movement provides a zero degree turning radius for the add-on section (10) which facilitates maneuvering of the combined unit.

The convertible seat (12) functions primarily to support seated passengers on the add-on section (10). The seating portion (16) of the convertible seat (12) has a dual function. It can provide seating for passengers riding on the add-on section with the pivoting panel (23) used as a back rest, or it can support an infant carrier with the second surface (56) used as a support area for holding the carrier.

When used as a seat, the seating portion (16) can accommodate about two children or at least one adult. The seat belts (19) are a safety device to secure passengers on the seating portion (16). A passenger seated on the seating portion (16) faces towards the front end of the add-on section (10). Consequently, when the add-on section (10) is attached to a shopping cart (2), the passenger's legs are positioned directly behind the rear of the cart (2). When safely tucked behind the cart (2), the passenger's legs will be less likely to extend out into the aisles and thereby avoid collisions with passing carts or other obstructions.

The armrests (17) assist passengers entering and exiting the add-on section (10). Since the armrests (17) flank the seating portion (16), they also provide comfort and security for seated passengers. With an infant carrier supported on the add-on section (10), the armrests (17) can also serve as bumpers on the side edges of the pivoting panel (23) to limit sideways movement of the infant carrier (57) on the panel (23).

When the pivoting panel (23) is in a raised position, the first surface (55) of the pivoting panel (23) serves as a back rest against which passengers seated on the add-on section (10) can lean, while the seat bottom (21) provides a surface on which the passengers sit.

The second surface (56) of the pivoting panel (23) serves as a support area for holding an infant carrier (57) thereon. In the lowered position of FIG. 4, the pivoting panel (23) rests on the seat bottom (21), and is therefore supported by the seat bottom (21). The lip (58) on the convertible member (22) acts as a retainer that inhibits an infant carrier (57) resting on the pivoting panel (23) from sliding off the outer edge of the second surface (56). Similarly, the armrests (17) also help to retain the infant carrier (57) on the seat portion (16). In cooperation with the lip (58), the holddown strap (62) secures the infant carrier (57) onto the pivoting panel (23).

The slats (51) on the seat bottom (21) in FIG. 3 are arranged in an open construction pattern so that open spaces occur between the slats (51). This open pattern of slats allows bits of debris to fall through the spaces to hinder the collection of debris on the seat portion (16). The slats (51) being constructed of plastic or other readily washable material, along with the open construction slat pattern also facilitates cleaning of the seat bottom (21).

The handle (20) provides a means for pushing and maneuvering the combined unit of FIG. 1 comprising the add-on section (10) and an attached shopping cart (2).

In a preferred embodiment shown in FIGS. 1 and 3, the lower support frame (13) of the add-on section (10) is mounted on the wheel assemblies (80) and the platform (15) sits on the front section (41) of the lower support frame (13). The wheel assemblies (80) are positioned near the rear end of the lower support frame (13). A front edge of the lower support frame (13) is attached to the adjustable cart mounting system (14).

The seating portion (16) is supported by the seat portion support (18) which is mounted on the rear section (42) of the lower support frame (13). Extending upwardly from the rear section (42) of the lower support frame (13) are the legs (48) comprising the seat portion support (18). The bottom frame (49) of the seating portion (16) is attached to upper ends of the legs (48). The slats (51) are secured to a top side of the bottom frame (49) to form the seat bottom (21). The seat portion support (18) provides support for the seating portion (16) of the convertible seat (12). The legs (48) of the seat portion support (18) create an open storage area (71) under the seat bottom (21) and allow the rear section of the lower support frame (13) to be used for storage.

In FIG. 2, the seat frame (52) extends upwardly at an oblique angle from the seat bottom (21), such that the vertical struts (53) are attached to tubular frame members (50) of the bottom frame (49). The horizontal members (54) extend across the vertical struts (53) and are attached thereto.

Figure 6:
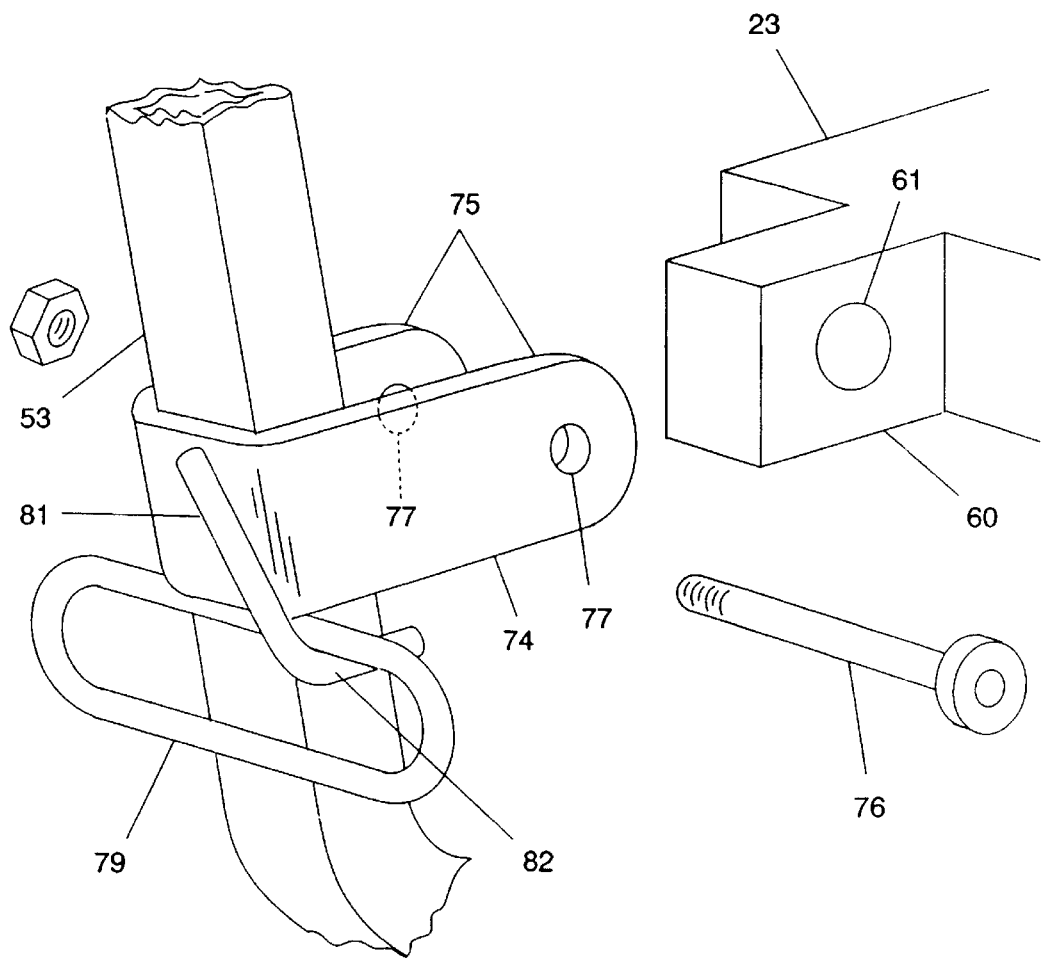
FIG. 6 is an partial rear perspective view of one of the pivotal connections of the add-on section in FIG. 1.

A plurality of attaching clips (79) shown in FIGS. 2 and 6 are secured to the seat frame (52) and hold the seat belts (19) on the seating portion (16). An attaching clip (79) is mounted on the lower end of each of the three vertical struts (53). Each set of seat belts (19) is attached to two of the attaching clips (79). The seat belts (19) extend from the respective attaching clips (79) between the seat bottom (21) and the pivoting panel (23) towards the front of the add-on section in order to fit around passengers seated in the seating portion (16).

One edge of the pivoting panel (23) is attached to the seat frame (52) by a friction hinge means which comprises a pair of pivotal connections (73), each attached to an ear (60) on the pivoting panel (23). The friction hinge means controls the freedom of movement of the pivoting panel (23) between the raised and lowered positions.

Referring to FIG. 6, each of the pivotal connections (73) comprises a clevis (74) having a pair of free ends (75) and a pin (76). Each of the free ends (75) of the clevis (74) has an aperture (77) therethrough. The apertures (77) on the free ends (75) are aligned with each other. In addition, an arm (81) is attached to a central portion of the clevis (74). The arm (81) is a hook and has a free end (82) that is spaced apart from the clevis (74). The free end (82) of each arm (81) hooks through an attaching clip (79) secured to the respective vertical strut (53). This cooperation between the arm (81) and the attaching clip (79) limits upward migration of the clevis (79) along the respective vertical strut (53).

In a preferred embodiment, the clevis (74) is disposed around the bottom of one of the vertical struts (53) forming the seat frame (52). An ear (60) of the pivoting panel (23) is positioned between the two free ends (75) of the respective clevis (74) with the apertures (77) in the free ends (75) aligned with the hole (61) in the associated ear (60). The pin (76) extends through the apertures (77) of the clevis (74) and the hole of the ear (60) to pivotally attach the former to the latter.

In the raised position the second surface (56) of the pivoting panel (23) preferably rests against the seat frame (52). Alternately, in the lowered position, the second surface (56) is spaced away from the seat back frame (52) such that the first surface (55) is adjacent to the seat bottom (21) with the first surface (55) resting atop the slats (51) of the seat bottom (21).

In a preferred embodiment, each pin (76) on the friction hinge means includes a bolt and a cooperating nut threadedly engaging the bolt. The nut can be advanced along the bolt to tighten the free ends (75) of each clevis (74) against the respective ear (60) of the pivoting panel (23), thereby creating a frictional engagement between each clevis (74) and its attached ear (60). The frictional engagement is defined by a frictional force that can be adjusted by changing the position of the nut on the bolt. For example, the frictional force is increased as the nut is tightened on the bolt and is decreased when the nut is loosened on the bolt. Preferably, the frictional force is adjusted to deter accidental dislodging of the pivoting panel (23) from its raised position and to inhibit free falling of the pivoting panel (23) between the raised and lowered positions by resisting applied forces that are of smaller magnitude than the adjusted frictional force, and to allow the panel (23) to be moved between the lowered and raised positions by yielding to a continuous force applied to the panel that is of greater magnitude than the frictional force.

Optionally, a holding device (78) shown in FIGS. 2 and 3 can be included on the add-on section (10) to assist in securing the pivoting panel (23) in the raised position. The holding device (78) is preferably one or more magnets that releasably attach the panel (23) to the seat frame (52). However, in lieu of magnets, other suitable holding devices known in the art could be used, including clips, straps, detents, clamps, snaps or hooks.

The handle (20) of the add-on section (10) is secured to a rear of the convertible seat (12). It is attached to the seat frame (52) of the seating portion (16) and extends in a direction rearwardly and upwardly from the seat frame (52).

Preferably, the holddown strap (62) is secured to the seating portion (16) of the convertible seat (12). Regarding the first section (63) of the holddown strap (62), the first (65)

and second (66) legs are attached to a respective elongated opening (59) situated in the lip (58) of the pivoting panel (23). The adjustable strap (81) of the second section (64) loops around a center one of the vertical struts (53) of the seat frame (52). Since the second section (64) freely encircles one of the vertical struts (53), it can slide vertically along the strut (53) to adjust to different size infant carriers.

The pivoting panel (23) has a raised position and a lowered position. In the raised position as shown in FIG. 2, the pivoting panel (23) is generally upright with the second surface (56) positioned adjacent to a front side of the seat frame (52). In this position the pivoting panel (23) provides a back rest for passengers seated on the add-on section (10).

Alternately, in the lowered position, the pivoting panel (23) is generally horizontally disposed with its first surface (55) resting on the top of the seat bottom (21). The second surface (56) is generally horizontal, forming a support area. The lip (58) is then protruding upwardly from the second surface (56).

The holddown strap (62) comprises an open configuration when the first (68) and second (69) interlocking parts of the releasable fastener are disengaged and the first (63) and second (64) sections are not adjoined to each other. The holddown strap (62) also includes a closed configuration in which the first (68) and second (69) interlocking parts of the fastener are engaged with each other, thereby linking the first (63) and second (64) sections of the holddown strap (62) together. In the closed configuration, the holddown strap (62) is preferably disposed above the second surface (56) of the pivoting panel (23).

As noted previously, the adjustable cart mounting system (14) is attached to a front end of the add-on section (10) thereby forming a leading edge on the lower support frame (13). When the add-on section (10) is attached to a shopping cart (2), a portion of the platform's front section (41) extends over a part of the cart's rear end and the clamps (35, 36) on the first (29) and second (30) extensible arms grasp the shopping cart's base frame (4). The front end of the add-on section (10) is supported on the shopping cart (2) by the cart mounting system (14).

In a preferred embodiment of the present invention, to attach the add-on section (10) to a shopping cart (2), the add-on section (10) is aligned behind the shopping cart (2) with the cart mounting system (14) positioned above the cart's base frame (4). The set screws (33) on the first (29) and second (30) ends of the support arm (26) are loosened allowing the first (29) and second (30) extensible arms to slide freely within the support arm (26). The extensible arms (29, 30) are extended or retracted to the desired position in which the respective notches (37) on the extensible arms (29, 30) fit over side members of the cart's base frame (4).

The set screws (33) on the support arm (26) are then tightened, thereby locking the first (29) and second (30) extensible arms against further sliding adjustment within the support arm (26). The U-bolts (39) are placed around the respective members of the cart's base frame (4), extended through the pair of apertures (38) on the respective first (29) and second (30) extensible arms, and secured in place with cooperating nuts (40).

The passenger leg room area (70) between the rear of the shopping cart (2) and the seat bottom (21) of the convertible seat (12) can be adjusted to different sizes. By changing the amount of leg room, the overall length of the combined unit is consequently changed.

To change the distance between the rear of the shopping cart (2) and the seat bottom (21), the set screws (33) are loosened to allow the first (29) and second (30) extensible arms to slide freely in the support arm (26) and the U-bolts (39) of the clamps (35, 36) are loosened to allow the cart's lower tubular members (5) to slide freely within the notches (37) and the U-bolts (39) on the extensible arms (29, 20). The cart mounting system (14) is moved along the cart's support frame (4) to the desired location thereon allowing the first (29) and second (30) extensible arms to freely adjust to the changing width of lower tubular members (5) of the shopping cart's base frame (4). The set screws (33) are tightened to lock the extensible arms (29, 30) in place, and the nuts (40) are tightened on the U-bolts (39) to lock the extensible arms (29, 30) onto the cart's support frame (4).

For seating passengers in the add-on section (10), the pivoting panel (23) is moved from a lowered position to the raised position, by applying a force to the panel that is greater than the frictional force of the hinge means and lifting the pivoting panel (23) upwardly until its second surface (56) rests against the seat frame (52). In the raised position, the pivoting panel (23) is rotated beyond vertical, so that the weight of the panel (23) acts with the frictional engagement of the hinge means to hold the second surface (56) against the seat frame (52). However, if desired, a holding device (78) can be used to provide additional assistance in holding the panel (23) against the seat frame (52). After the pivoting panel (23) is moved to the raised position, the holding device (78) is engaged, thereby securing the pivoting panel (23) in the raised position. Passengers entering the add-on section (10) can step on the front section (41) and sit down on the seat bottom (21). The seat belts (19) can then be fastened around the passengers in a conventional manner. To exit the add-on section (10), the seat belts (19) are released and the passenger can step off of the platform (15).

To convert the add-on section (10) to hold an infant carrier, the pivoting panel (23) is moved into the lowered position from the raised position by releasing the holding device (78), if applicable, and applying a force to the panel to overcome the frictional force of the hinge means while lowering the pivoting panel (23) downwardly until the first surface (55) is adjacent to and resting on the slats (51) of the seat bottom (21). The second surface (56) of the pivoting panel (23) forms a support area with a generally horizontal surface.

To attach an infant carrier (57) to the add-on section with the pivoting panel (23) in the lowered position, the infant carrier (57) is placed on the second surface (56) and the holddown strap (62) is engaged in the closed configuration. To engage the holddown strap (62), the first (63) and second (64) sections are drawn together across the infant carrier (57) and attached to each other by engaging the first (68) and second (69) interlocking parts of the releasable fastener. The length of the holddown strap (62) is adjusted to fit securely around the infant carrier (57) positioned on the second surface (56) of the pivoting panel (23).

To remove the infant carrier (57), the holddown strap (62) is moved to the open configuration by disengaging the first (68) and second (69) interlocking parts of the releasable fastener. The holddown strap (62) is removed from the carrier (57) and the infant carrier is then lifted off of the add-on section (10).

When the add-on section is properly attached to a shopping cart, the combined unit is maneuvered much like a conventional shopping cart by using the handle of the add-on section. Due to the free rotation of the wheel assemblies, the combined unit has a zero degree turning radius, which results in easy cornering, as well as other maneuvering.

The add-on section of the present invention is a shopping aid for carts that can provide seating for adults, provide additional seating for children, or alternately provide a support area for securely retaining a conventional infant carrier with infant. The seating portion of the add-on section easily converts from a seat to a support area for holding the infant carrier.

With a means for releasably holding an infant carrier on the add-on section, it is not necessary for a shopper with a baby already in his own infant carrier to move the child from his carrier to a carrier provided on the shopping cart. In addition, the basket on the cart is left free for storing other items. By moving the pivoting panel to the lowered position and attaching the carrier to the panel, a shopper can easily convert the seat to a support area for the infant carrier and a resting infant can remain undisturbed. The carrier can also be quickly released and removed from the add-on section when shopping is completed.

The add-on section can be readily converted from accommodating seated passengers to accommodating an infant in a carrier. The convertible member on the seating portion of the present invention renders the add-on section versatile enough to accommodate a wide range of passengers, from newborns to the elderly.

Figure 7:
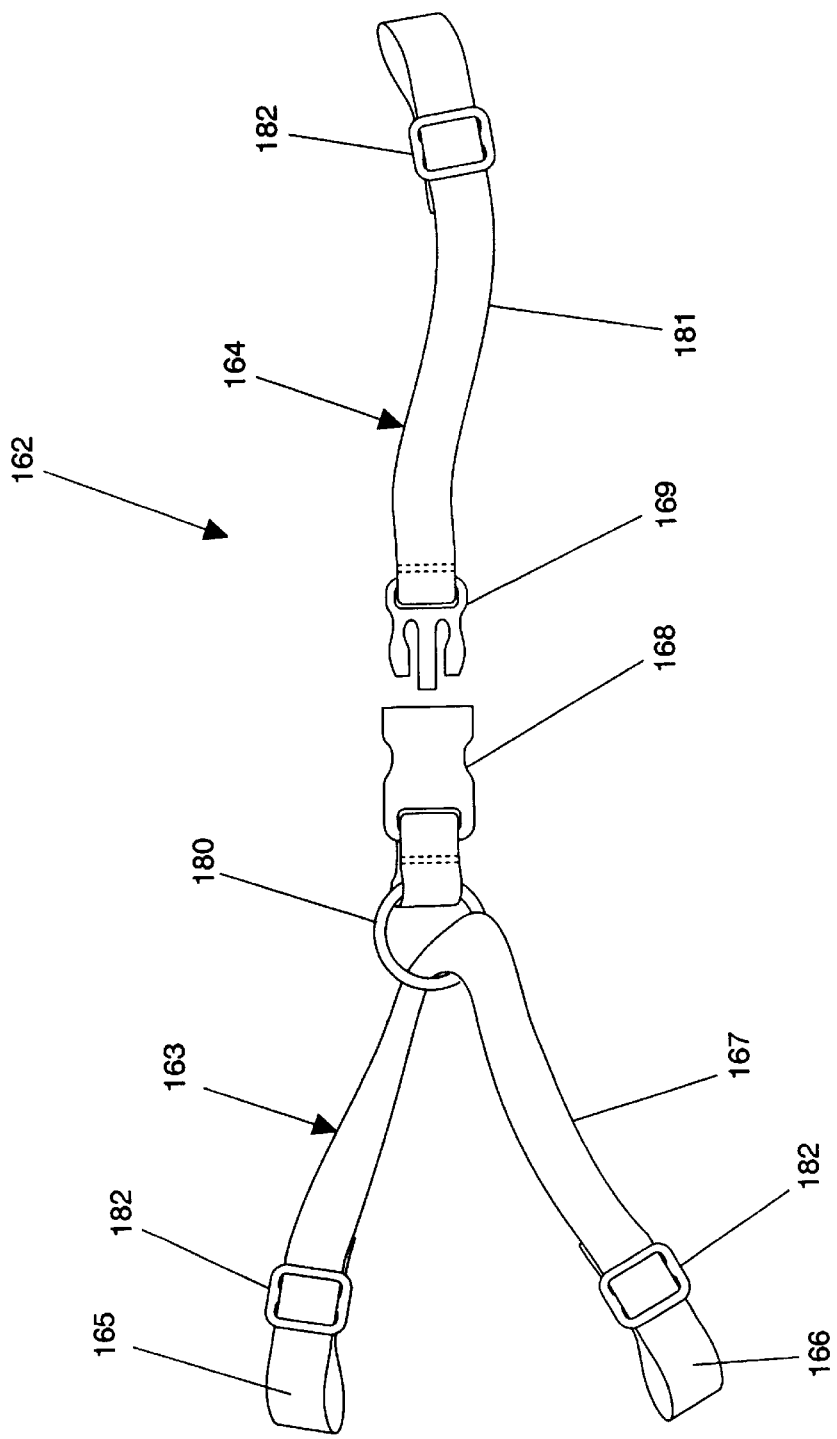
FIG. 7 is another preferred embodiment of the holddown strap used on the convertible seat of the present invention.

In another preferred embodiment of the invention, an alternate holddown strap (162) as shown in FIG. 7 is used on the convertible seat. The holddown strap (162) comprises first (163) and second (164) sections. The first section (163) is an adjustable strap (167) having a pair of ends (165, 166). Each of the ends (165, 166) attaches to a respective elongated opening on the pivoting panel. An adjusting element (182) on each of the end (165, 166) of the first section (163) allows the effective length of the strap (167) to be adjusted. A slip ring (180) encircles the adjustable strap (167) and is freely slideable thereon. Although the slip ring (180) disclosed herein is circular in shape, it could be an oblong, rectangular, irregular or other desired shape instead.

The second section (164) is another adjustable strap (181) that forms a loop for attaching to the seat frame of the convertible seat. Similar to the first section (163), the strap (181) of the second section (164) also includes and adjusting element (182).

In order to deter unwanted removal of the holddown strap (162) from the convertible seat, it is desirable to inhibit removal of the straps (167, 181) from the respective adjusting elements (182). Therefore, the ends (165, 166) of the first section (163) and an end of the second section (164) each include a stop element that limits movement of the respective strap end relative to its associated adjusting element.

Preferably, each stop element is disposed adjacent to a respective outermost end of the associated strap. The stop element is sized to inhibit the element's passage through the adjusting element and thereby keep the outermost end of the associated strap from passing through the adjusting element. Consequently, pulling the straps completely out of the adjusting elements in order to remove the holddown strap from the convertible seat is rendered difficult by the stop elements. The stop elements can comprise various types of protuberances or enlarged portions on the straps, including, but not limited to, buttons, snaps, hooks or rivets.

The first (163) and second (164) sections can be joined together by a releasable fastener which includes first (168) and second (169) interlocking parts. The first interlocking part (168) is mounted on the slip ring (180) and can move with the slip ring (180) along the adjustable strap (165) of the first section (163). By moving the slip ring (180) along the adjustable strap (167), the holddown strap (162) can be adjusted. The second interlocking part (169) is attached to the other adjustable strap (181) comprised by the second section (164).

The first (168) and second (169) interlocking parts are joined to define the closed configuration of the holddown strap (162). Conversely, the interlocking parts (168, 169) can be released from each other to separate the sections (163, 164) of the holddown strap (162) into the open configuration.

The convertible seat of the present invention is not limited to the use disclosed herein. It should be appreciated that the convertible seat could be used with other known add-on sections for shopping carts, as well as used for seating in an altogether different environment from cart add-on sections. Furthermore, the pivoting panel of the convertible seat could be used on other types of seat arrangements having a suitable cooperating seat bottom.

Although the present invention has been described in considerable detail with reference to certain preferred versions thereof, other versions are possible. Therefore, the spirit and scope of the appended claims should not be limited to the description of the preferred versions contained herein.

What is claimed is:

1. A convertible seat comprising:

a seat bottom;

a seat frame;

a pivoting panel having a first surface and a second surface disposed opposite said first surface;

a lip disposed along a free edge of the pivoting panel, wherein said lip projects outwardly from said second surface;

a releasable holddown strap attached to the pivoting panel and having an open configuration and a closed configuration, wherein said holddown strap extends across said second surface of said pivoting panel when said releasable holddown strap is in said closed configuration; and hinge means for securing the pivoting panel to said seat frame;

wherein said seat frame is mounted on said seat bottom and said pivoting panel is pivotally attached to said seat frame by said hinge means;

said pivoting panel being moveable between a raised position and a lowered position;

wherein in said raised position the first and second surfaces of the pivoting panel extend angularly outward from said seat bottom, and in said lowered position, said first surface of said pivoting panel is disposed adjacent to said seat bottom.

2. The convertible seat of claim 1, wherein said hinge means comprises at least one pivotal connection, said at least one pivotal connection comprises a clevis having two free ends with aligned apertures disposed in the free ends and a pin, said pivoting panel further comprising at least one ear extending from an edge thereof, said ear having a hole extending therethrough;

said clevis is attached to said seat frame and to said pivotal panel, wherein at least one ear is positioned between said two free ends of said clevis with said pin extending through said aligned apertures and said hole.

3. The convertible seat of claim 2, further comprising at least one attaching clip on said seat frame, said at least one clevis further comprising an arm that engages said attaching clip.

4. The convertible seat of claim 3, wherein the arm limits movement of said clevis on said seat frame in a direction away from said attaching clip.

5. The convertible seat of claim 3, wherein said arm comprises a hook which engages said attaching clip.

6. The convertible seat of claim 2, wherein said pivotal connection further comprises a frictional engagement between said clevis and said ear, and said frictional engagement is adjustable.

7. The convertible seat of claim 6, wherein said frictional engagement further maintains the pivoting panel in the raised position.

8. The convertible seat of claim 1, wherein said first surface is a seat back support when said pivoting panel is in said raised position, and said second surface is a support area for an infant carrier when said pivoting panel is in said lowered position.

9. The convertible seat of claim 1, wherein said hinge means for securing the pivoting panel to said seat frame comprises an adjustable frictional engagement.

10. A convertible seat comprising:
   a seat bottom;
   a seat frame;
   a pivoting panel having a first surface and a second surface disposed opposite said first surface;
   a holddown strap comprising a first section, a second section slideably attached to said seat frame and a releasable fastener for attaching the first and second sections together, said first section is generally V-shaped and includes first and second legs attached together at an apex; and
   hinge means for securing the pivoting panel to said seat frame;
   wherein said seat frame is mounted on said seat bottom and pivoting panel is pivotally attached to said seat frame by said hinge means;
   said pivoting panel being moveable between a raised position and a lowered position;
   wherein in said raised position the first and second surfaces of the pivoting panel extend angularly outward from said seat bottom, and in said lowered position, said first surface of said pivoting panel is disposed adjacent to said seat bottom; said pivoting panel further comprising a lip disposed along a free edge of the pivoting panel which projects outwardly from said second surface; said lip having a pair of openings disposed therein; and said first leg of said holddown strap is attached to one of said openings and said second leg of said holddown strap is attached to another of said openings.

11. The convertible seat of claim 10, wherein said holddown fastener is adjustable in length.

12. The convertible seat of claim 10, wherein said releasable fastener is slideably mounted on said first section.

13. The convertible seat of claim 12, wherein said releasable fastener comprises first and second interlocking parts, wherein said first interlocking part is attached to the first section and the second interlocking part is attached to the second section.

14. The convertible seat of claim 10, wherein said holddown strap further comprises a ring;
   said ring is slideably attached to said first section; and
   said releasable fastener having first and second interlocking parts, wherein said first interlocking part is attached to said ring and said second interlocking part is attached to said second section.

15. The convertible seat of claim 14, wherein said first section comprises first and second ends;
   said first and second ends are attached to said pivoting panel; and
   said second section is attached to said seat frame.

16. An add-on section for attaching to a shopping cart comprising a basket supported on a wheeled base frame including at least two lower tubular members, said add-on section comprising:
   (1) a base having a lower support frame with a front section providing passenger leg room area and a rear section providing a storage area, a platform, and a plurality of wheel assemblies attached to the lower support frame, each wheel assembly including a wheel, a wheel brake and a pivot bearing;
   (2) a convertible seat comprises a seating portion, a plurality of support legs extending upwardly from said base, said seating portion including a seat bottom, a seat frame, a pivoting panel and armrests; said seat bottom includes a bottom frame mounted on the support legs and slats mounted on the bottom frame, said pivoting panel includes first and second surfaces, at least one ear and a lip; said at least one ear extends outwardly from an edge of the pivoting panel and has a hole therethrough, said lip projects outwardly from the second surface and is disposed along an edge of the pivoting panel opposite the at least one ear, said lip further having at least one elongated opening therethrough;
   said pivoting panel being moveable between a raised position and a lowered position, wherein in said raised position said second surface is adjacent to said seat frame, and in said lowered position said first surface is approximately adjacent to the seat bottom;
   said convertible seat further comprises at least one pivotal connection for attaching the pivoting panel to the seat frame, said at least one pivotal connection includes a clevis having two free ends, each of the two free ends has an aperture therethrough, the apertures on the free ends of the clevis are aligned, said at least one pivotal connection further comprises a pin, wherein said clevis is positioned around said seat frame, said at least one ear is disposed between the two free ends of said clevis, the apertures of said clevis are aligned with the hole of said ear, and said pin extends through the apertures of said clevis and the hole of said ear, said at least one pivotal connection further comprising an adjustable frictional engagement between said clevis and said ear;
   (3) a handle for maneuvering the add-on section and attached shopping cart, said handle is attached to the convertible seat;
   (4) an adjustable cart mounting system for attaching the add-on section to the shopping cart, said adjustable cart mounting system comprising a support arm formed by a hollow tubular member having first and second ends, said adjustable cart mounting system further comprising first and second extension arms, a locking means for adjustably securing the extension arms on the support arm and a first and second clamp for receiving the at least two lower tubular members of the shopping cart;
   (5) a holddown strap for securing an infant carrier on the second surface of the pivoting panel when said pivoting panel is in the lowered position, said holddown strap comprising first and second sections with a releasable fastener, said releasable fastener having respective first and second interlocking parts, said first section having at least one leg, the first interlocking part of the releasable fastener is attached to the at least one leg of the first section, said at least one leg is secured to said at least one elongated opening in said lip, said second portion is attached to said seat frame, said second interlocking part of the releasable fastener is attached to said second section of the holddown strap; and (6) a plurality of seat belts on the seating portion for securing seated passengers on the add-on section when the pivoting panel is in the raised position.

17. An add-on section for attaching to a shopping cart, said add-on section comprises:

a base including a lower support frame and a plurality of wheels attached to the lower support frame;

a cart mounting system for attaching the base of the add-on section to the shopping cart;

a convertible seat including a seating portion and a seat portion support;

said seating portion comprises a seat bottom, a seat frame, a pivoting panel and hinge means for securing the pivoting panel to said seat frame;

said pivoting panel having a first surface and a second surface disposed opposite said first surface and a lip disposed along a free edge thereof, said lip projecting outwardly from said second surface;

wherein said seat portion support is mounted on said base, said seat bottom is mounted on said seat portion support, said seat frame is mounted on said seat bottom, and said pivoting panel is pivotally attached to said seat frame by said hinge means;

said pivoting panel is moveable between a raised position and a lowered position;

wherein said raised position comprises the first and second surfaces of the pivoting panel extending outwardly at an angle from said seat bottom, and said lowered position comprises the first surface of the pivoting panel disposed approximately adjacent to said seat bottom.

18. The add-on section of claim 17, further comprises a holddown strap on the pivoting panel.

19. The add-on section of claim 18, wherein said holddown strap further comprises a first section, a second section and a releasable fastener having first and second interlocking parts;

wherein said first section is attached to said pivoting panel and to said first interlocking part of the releasable fastener; and said second section is attached to said seat frame and to said second interlocking part of the releasable fastener.

20. The add-on section of claim 19, wherein said first surface is a seat backrest when said pivoting panel is in said raised position, and said second surface is a support area for an infant carrier when said pivoting panel is in said lowered position.

21. The add-on section of claim 20, wherein when said pivoting panel is the lowered position and said first and second interlocking parts of the releasable fastener are engaged, the holddown strap extends over the second surface of said pivoting panel.

22. The convertible add-on section of claim 20, wherein said lip of the pivoting panel has at least one opening disposed therein, and said first section of the holddown strap is attached to said opening.

23. The add-on section of claim 18, wherein said holddown strap further comprises a first section, a second section, and a releasable fastener for adjoining the first and second sections;

wherein said releasable fastener is slideably mounted on the first section.

24. The add-on section of claim 18, wherein said holddown strap further comprises first and second sections, a ring, and a releasable fastener;

said ring is slideably attached to said first section;

said releasable fastener having first and second interlocking parts, wherein said first interlocking part is attached to said ring and said second interlocking part is attached to said second section.

25. The add-on section of claim 24, wherein said first section comprises first and second ends;

said first and second ends are attached to said pivoting panel; and said second section is attached to said seat frame.

26. An add-on section for attaching to a shopping cart, said add-on section comprises:

a base including a lower support frame and a plurality of wheels attached to the lower support frame;

a cart mounting system for attaching the base of the add-on section to the shopping cart;

a convertible seat including a seating portion and a seat portion support;

said seating portion comprises a seat bottom, a seat frame, a pivoting panel and hinge means for securing the pivoting panel to said seat frame;

said seating portion further comprises an arm and at least one attaching clip disposed on said seat frame;

said hinge means comprises at least one pivotal connection;

said at least one pivotal connection comprises a clevis;

said pivoting panel having a first surface and a second surface disposed opposite said first surface and at least one ear extending from an edge thereof;

wherein said seat portion support is mounted on said base, said seat bottom is mounted on said seat portion support, said seat frame is mounted on said seat bottom, said pivoting panel is pivotally attached to said seat frame by said hinge means, said at least one clevis is attached to said seat frame and to said at least one ear of the pivoting panel, and said arm extends outwardly from said clevis and engages said attaching clip;

said pivoting panel is moveable between a raised position and a lowered position;

wherein said raised position comprises the first and second surfaces of the pivoting panel extending outwardly at an angle from said seat bottom, and said lowered position comprises the first surface of the pivoting panel disposed approximately adjacent to said seat bottom.

27. The add-on section of claim 26, wherein said hinge means for securing the pivoting panel to said seat frame comprises an adjustable frictional engagement.

28. The add-on section of claim 26, wherein said pivotal connection further comprises a frictional engagement between said clevis and said ear, and said frictional engagement is adjustable.

29. The add-on section of claim 28, wherein said frictional engagement further maintains the pivoting panel in the raised position.

* * * * *